United States Patent
Lepeshenkov (10) Patent No.: US 9,485,098 B1
(45) Date of Patent: Nov. 1, 2016

(54) SYSTEM AND METHOD OF USER AUTHENTICATION USING DIGITAL SIGNATURES

(71) Applicant: Kaspersky Lab ZAO, Moscow (RU)

(72) Inventor: Konstantin E. Lepeshenkov, Moscow (RU)

(73) Assignee: AO Kaspersky Lab, Moscow (RU)

( * ) Notice: Subject to any disclaimer, the term of this patent is extended or adjusted under 35 U.S.C. 154(b) by 0 days.

(21) Appl. No.: 14/805,864

(22) Filed: Jul. 22, 2015

(51) Int. Cl.
 *H04L 9/32* (2006.01)
 *H04L 9/08* (2006.01)
 *G06F 21/62* (2013.01)

(52) U.S. Cl.
 CPC ............. *H04L 9/3247* (2013.01); *G06F 21/62* (2013.01); *H04L 9/0894* (2013.01); *H04L 9/3231* (2013.01)

(58) Field of Classification Search
 CPC . H04L 9/3247; H04L 9/0894; H04L 9/3231; G06F 21/62
 See application file for complete search history.

(56) References Cited

U.S. PATENT DOCUMENTS

| | | | | |
|---|---|---|---|---|
| 6,035,398 | A * | 3/2000 | Bjorn | G06K 9/00006 713/185 |
| 6,633,862 | B2 * | 10/2003 | Thompson | G06F 17/30008 707/610 |
| 7,519,204 | B2 * | 4/2009 | Bjorn | G06F 21/32 340/5.53 |
| 7,623,659 | B2 | 11/2009 | Huang et al. | |
| 8,472,680 | B2 | 6/2013 | Choi et al. | |
| 2005/0246763 | A1 | 11/2005 | Corcoran et al. | |
| 2013/0305055 | A1 | 11/2013 | Atherton | |

FOREIGN PATENT DOCUMENTS

EP 2224368 A2 1/2010

OTHER PUBLICATIONS

Lee et al. (Biometric Key Binding: Fuzzy Vault Based on Iris Images, LNCS 4642, pp. 800-808, 2007).*
Hafslund et al. (Secure Extension to the OLSR protocol, OLSR Interop and Workshop, 2004, pp. 1-4).*

* cited by examiner

*Primary Examiner* — Oleg Korsak
(74) *Attorney, Agent, or Firm* — Arent Fox LLP; Michael Fainberg (57) ABSTRACT

The present disclosure pertains to data security, and more specifically, to a method and system of user authentication using an electronic digital signature of the user. An exemplary method includes obtaining biometric data of the user, calculating a biometric key based on the biometric data, identifying encrypted confidential information of the user in an electronic database and decrypting the identified confidential information of the user using the calculated biometric key. Furthermore, the method includes calculating a cryptographic key using a first portion of the decrypted confidential information of the user; generating an electronic digital signature of the user based on the cryptographic key; verifying the electronic digital signature using a second portion of the decrypted confidential information; and authenticating the user to access the data if the electronic digital signature is verified.

21 Claims, 3 Drawing Sheets

SYSTEM AND METHOD OF USER AUTHENTICATION USING DIGITAL SIGNATURES

FIELD OF TECHNOLOGY

The present disclosure relates to the field of data security, and, more specifically, to a system and method of user authentication using an digital signatures.

BACKGROUND

The widespread use of various computing devices (e.g., personal computers, notebooks, tablets, smartphones, and the like), the advent of high-performance servers and high-capacity data storage, the significant increase in the capacity of computer networks and substantial lowering of the price of network traffic to the end user in recent years has given a powerful impetus to the use of external servers for data processing and storage by individual users and entire organizations. For example, cloud technologies are becoming increasingly popular, such as cloud computing (i.e., a technology of online computing providing universal and convenient network access on demand to computing resources) and cloud data storage (i.e., a technology of online storage providing data storage on many servers distributed throughout the network).

The data being remotely stored and processed often has high value, and unauthorized access to it may lead to large financial losses, for example, as in the case of theft of remotely stored and processed data. Therefore, there is currently significant attention and resources applied to the security of data access and the storage and use of data.

One stage of remote data access is the authentication of the user in the data storage system. During the authentication, the user sends authentication data to the server, such as log-in and password. At this stage, hackers have an opportunity to intercept the authentication data being transmitted by the user for an unauthorized accessing of the user's data in the remote storage. In particular, even if the hacker only intercepts the check sum of the password (e.g., md5 is often used as the check sum), a hacker can reconstruct the password by trial and error (i.e., brute force) or by finding collisions/clashes and gain access to other user data (e.g., email).

To increase the security of authentication, several techniques of biometric authentication, a multistage authentication, when the user indicates authentication data obtained from various sources (such as log-in and password in the possession of the user, plus access code which the user obtains from the server on his mobile telephone), and others are widely used. Greater security of authentication is achieved by increasing the quantity of authentication data (as in the case of a multistage authentication) and the methods of obtaining such data (as in the case of biometric authentication), therefore, making it more difficult for hackers to obtain and use this authentication data.

Although the above-described operating methods can suitably handle the tasks of authenticating users and providing them with data stored on servers, these methods are often no help in the case of directed attacks, when hackers do not employ standard methods of access to the user data (such as hacking or stealing of passwords and other confidential data), but those narrowly focused on a particular system (such as by exploiting vulnerabilities in the system) or the method of transmission of confidential data (such as intercepting and subsequent exploiting of authentication requests).

SUMMARY

The disclosed system and method solves the problem of safe user authentication that is resistant to attacks. In particular, the system and method is designed for user authentication using an electronic digital signature of the user.

Advantageously, the technical result of the disclosed system and method includes increasing the security of user authentication by the use of user authentication using an electronic digital signature of the user, created by a cryptographic transformation of the user's data with the use of a cryptographic key, which is computed from biometric data of the user.

According to one aspect, a method is disclosed for authenticating a user to access data. The exemplary the method includes obtaining biometric data of the user; calculating, by a hardware processor, a biometric key based on the biometric data; identifying, by the hardware processor, encrypted confidential information of the user in an electronic database; decrypting, by the hardware processor, the identified confidential information of the user using the calculated biometric key; calculating, by the hardware processor, a cryptographic key using at least a first portion of the decrypted confidential information of the user; generating, by the hardware processor, an electronic digital signature of the user based on the cryptographic key; verifying, by the hardware processor, the electronic digital signature using at least a second portion of the decrypted confidential information; and authenticating, by the hardware processor, the user to access the data if the electronic digital signature is verified.

According to another aspect, the first portion of the decrypted confidential information of the user is one of a public cryptographic key and a private cryptographic key, and the second portion of the decrypted confidential information of the user is the corresponding private or public cryptographic key.

According to another aspect, the generating, by the hardware processor, of the electronic digital signature of the user comprises encrypting a set of data by the cryptographic key.

According to another aspect, the set of data is a timestamp for when the encrypted confidential information of the user is identified in the electronic database, and the verifying of the electronic digital signature includes decrypting the electronic digital signature using the second portion of the decrypted confidential information; and comparing the timestamp from the decrypted electronic digital signature with an original timestamp for when the encrypted confidential information of the user is identified in the electronic database.

According to another aspect, the encrypted confidential information of the user includes an encrypted private cryptographic key with the biometric data of the user.

According to another aspect, the method further includes storing the encrypted private cryptographic key in the electronic database by: obtaining an image of a fingerprint of the user; identifying for points of interest in the image; calculating parameters of the points of interest; creating the encrypted private cryptographic key based on the calculated parameters of the points of interest; and storing the encrypted private cryptographic key in the electronic database.

According to another aspect, the values of the parameters are calculated for the polynomial:

$$y_j = \sum_{i=1}^{N} k_i \times x_j^i$$

where $y_j$ is a value of the polynomial for a selected point of interest, $k_i$ is an ith 4-byte number obtained from the cryptographic private key, $x_j^i$ is a parameter of the jth point of interest, and N is a degree of the polynomial that is equal to a set of numbers obtained from the cryptographic private key.

According to another aspect, the biometric data includes one or more of a fingerprint, retinal scan, iris recognication and voice sample.

According to another aspect, a system is disclosed for authenticating a user to access data. According to one aspect, the system includes an electronic database configured to stored encrypted confidential information of the user; and a hardware processor configured to: obtain biometric data of the user; calculate a biometric key based on the biometric data; identify the encrypted confidential information of the user in the electronic database; decrypt the identified confidential information of the user using the calculated biometric key; calculate a cryptographic key using at least a first portion of the decrypted confidential information of the user; generate an electronic digital signature of the user based on the cryptographic key; verify the electronic digital signature using at least a second portion of the decrypted confidential information; and authenticate the user to access the data if the electronic digital signature is verified.

According to yet another aspect, a non-transitory computer readable medium storing computer executable instructions for authenticating a user to access data is disclosed. According to one aspect, the non-transitory computer readable medium includes instructions for obtaining biometric data of the user; calculating a biometric key based on the biometric data; identifying encrypted confidential information of the user in an electronic database; decrypting the identified confidential information of the user using the calculated biometric key; calculating a cryptographic key using at least a first portion of the decrypted confidential information of the user; generating an electronic digital signature of the user based on the cryptographic key; verifying the electronic digital signature using at least a second portion of the decrypted confidential information; and authenticating the user to access the data if the electronic digital signature is verified.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and particularly pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Example aspects are described herein in the context of a system, method, and computer program product for user authentication using an electronic digital signature of the user. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

Initially, the following discussion provides a brief explanation of the terms and concepts described herein in the context of the disclosed system and method.

Asymmetrical encryption algorithm—An algorithm for encryption or an electronic digital signature in which a public key is transmitted by a public channel (i.e., not protected, accessible to observation) and used for checking an electronic digital signature and for encrypting a message. A private key is used to create the electronic digital signature and for the decryption of the message.

User authentication—A procedure to check/verify the identity of a user by comparing confidential data entered by the user (such as a password) against confidential data saved in a confidential user database.

Biometric data—Considered to be measurable physiological (e.g., fingerprint, retinal scan, iris recognication, voice sample, etc.) and behavioral data of a living person (e.g., handwriting sample, lexical speech parameters, or type of gestures or gait). It should be understood that biometric data is unique, and, therefore, can be used for user identification.

Cryptographic key—Secret information used by a cryptographical algorithm during encrypting/decrypting of messages, composing and checking an electronic digital signature, and the like. The result of the encryption for one algorithm or another used will depend on the key.

Points of interest—Elements of biometric data (such as elements of the papillary pattern for fingerprints, such as arches, loops, whorls, and the like), the totality of the parameters of which (such as the coordinates locating the elements of the papillary pattern with respect to other elements of the papillary pattern, the dimensions, the type of elements of the papillary pattern, and so on, for fingerprints) is unique to each person.

Electronic digital signature—An item of an electronic document obtained as a result of cryptographic transformation of information using a private signature key and allowing one to certify no distortion of the information in the electronic document in its state at the time of formation of the signature and to verify that the signature belongs to the owner of the signature key certificate. The electronic digital signature is designed to identify the person signing an electronic document, and makes it possible to verify the integrity of a document being sent. Thus, the signature becomes invalid with any random or deliberate alteration of the document, since it has been computed on the basis of the initial condition of the document and corresponds only to the initial condition.

Figure 1:
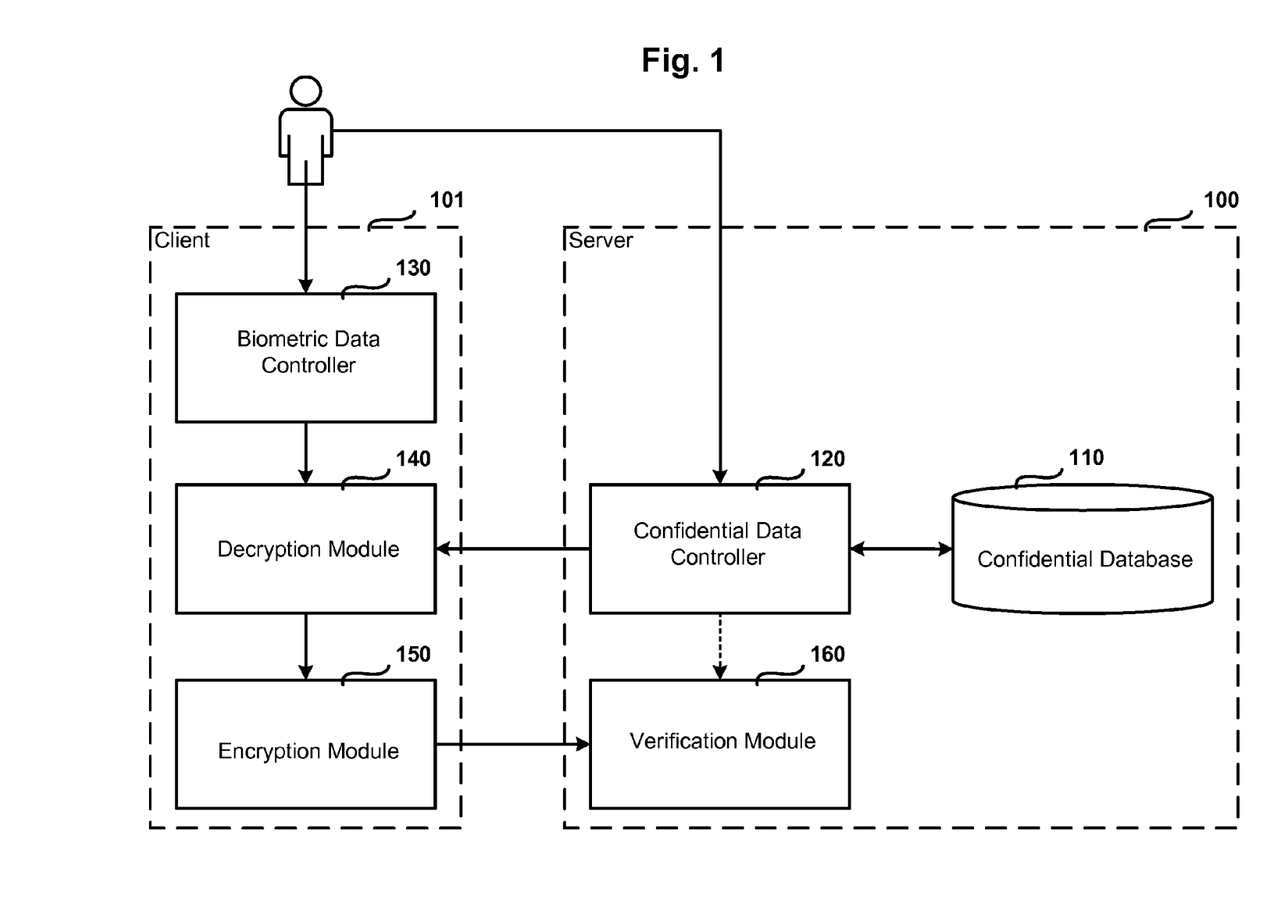
FIG. 1 illustrates a block diagram of a user authentication system according to an exemplary aspect.

FIG. 1 illustrates a block diagram of a user authentication system according to an exemplary aspect. As shown, the user authentication system includes a server 100 configured to store, process, and also exercise control (i.e., provide data access only to users who have corresponding access rights, such as those having undergone authentication) of confidential data received from a client 101. In one example aspect, the server 100 includes a confidential database 110, a confidential data controller 120 and a verification module 160. The client 101 is configured to create process and send the confidential user data to the server 100. In one example aspect, the client 101 includes a biometric data controller 130, the decryption module 140 and the encryption module 150.

According to an exemplary aspect, the confidential database 110, which may be a module of or be connected via a network to the server 100 and is configured to store encrypted confidential user data obtained from the client 101. In aspect, the confidential data that can be stored and saved in encrypted form in the confidential database 110 can include, for example, cryptographic keys for the asymmetrical encryption system (i.e., both the public cryptographic key and the private cryptographic key), and the parameters by which the cryptographic keys can be computed for the asymmetrical encryption system (such as 32 4-byte numbers from which a 128-byte cryptographic key will be assembled by the method of concatenation).

According to an exemplary aspect, the confidential data controller 120, which may be a module of the server 100, is configured to search, on user request, for encrypted confidential user data in the confidential database 110 and transmit the identified encrypted confidential user data to the decryption module 140. According to one exemplary aspect, the search criterion for the encrypted confidential data may include at least one of the log-in or check sum (e.g., md5) from the user's log-in and/or the identifier of the device from which the user is performing the authentication on the server 100.

According to one exemplary aspect, the biometric data controller 130, which may be a module of the client 101, is configured to collect biometric data from the user; compute a biometric key on the basis of the collected biometric data; and transmit the computed biometric key to the decryption module 140. Although not shown, it should be appreciated to one skilled in the art that the client 101 can include appropriate sensors (e.g., retinal or fingerprint scanners), to enable the biometric data controller 130 to collected the biometric data accordingly.

According to one aspect, the biometric key can be at least a set of parameters of points of interest (POI). For example, the POI can include, but are not limited to, coordinates locating the elements of the papillary pattern with respect to other elements of the papillary pattern, the dimensions, the types of elements of the papillary pattern, for fingerprints, and the like.

According to one aspect, the method for computing the biometric key on the basis of gathered biometric data is at least a search for points of interest in the gathered biometric data and subsequent determination of the parameters of the identified points of interest.

The decryption module 140, which is part of the client 101, is configured to decrypt the encrypted confidential user data obtained from the confidential data controller 120 using the biometric key computed by the biometric data controller 130; compute the cryptographic key on the basis of the decrypted confidential user data; and transmit the computed cryptographic key to the encryption module 150.

According to one aspect, the method for decrypting the encrypted confidential user data utilizes an algorithm working with fuzzy containers.

The method of computing the cryptographic key on the basis of the decrypted confidential user data (which are components of the cryptographic key) is at least a concatenation of the components of the cryptographic key according to an exemplary aspect.

The encryption module 150, which is part of the client 101, is configured to create an electronic digital signature of the user by using the cryptographic key obtained from the decryption module 140 and to transmit the electronic digital signature of the user to the verification module 160.

In one aspect, the creation of the electronic digital signature of the user may be done by encrypting with the cryptographic key obtained from the decryption module 140 a set of data including, but not limited to, a random data set (for example, one created by the encryption module 150 before beginning the creation of the electronic digital signature of the user) and/or a timestamp (for example, the timestamp of the user accessing the confidential data controller 120 to search the encrypted confidential user data in the confidential database 110).

The verification module 160, which is part of the server 100, is configured to check the electronic digital signature of the user received from the encryption module 150 with the aid of the confidential user data from the confidential database 110 and authenticate the user if positive results of the check are obtained.

According to one aspect, the confidential user data to be used for checking the electronic digital signature obtained from the encryption module 150 can include, but is not limited to, a public cryptographic key (in the event that a private cryptographic key was the encrypted confidential data transmitted by the confidential data controller 120 to the decryption module 140) or a private cryptographic key (in the event that a public cryptographic key was the encrypted confidential data transmitted by the confidential data controller 120 to the decryption module 140).

According to one aspect, the checking of the electronic digital signature obtained from the encryption module 150 with the aid of the public cryptographic key from the confidential database 110 includes at least one of the asymmetrical algorithms for checking an electronic digital signature, such as the ElGamal scheme; the Schnorr scheme; the Rabin signature probabilistic scheme, and the like, as would be understood to one skilled in the art.

In one aspect, the checking of the electronic digital signature obtained from the encryption module 150 with the aid of the private cryptographic key from the confidential database 110 is at least one of the asymmetrical encryption algorithms, including, but not limited to the ElGamal encryption system, the Diffie Hellman key exchange scheme, the RSA system, and the like, as would be understood to one skilled in the art.

The results of the verification of the electronic digital signature obtained from the encryption module 150 by one of the asymmetrical algorithms can be a verdict/determination that the public cryptographic key used to perform the verification of the electronic digital signature belongs to the pair of cryptographic public and private keys from which the private cryptographic key was used by the encryption module 150 to create the electronic digital signature being checked. If this condition is satisfied, the result of the checking of the electronic digital signature obtained from the encryption module 150 is considered to be positive. Moreover, the results of the verification of the electronic digital signature obtained from the encryption module 150 by one of the asymmetrical algorithms can be a verdict/determination that the encrypted data decrypted by the private cryptographic key in the form of the electronic digital signature obtained from the encryption module 150 is identical to the data created by the verification module 160.

In one aspect, the data created by the verification module 160 for use in checking the electronic digital signature transmitted by the encryption module 150 can be a timestamp (for example, the timestamp of the user accessing the confidential data controller 120 in order to search the encrypted confidential user data in the confidential database 110).

The following discussion provides an explanation of the operation of the user authentication system illustrated in FIG. 1 on the example of a fingerprint authentication of a user on a server. Initially, prior to registration on the server 100, the user creates a pair of cryptographic keys (public and private cryptographic keys). Once created, the user encrypts the private cryptographic key with his biometric data, and sends the encrypted private cryptographic key and the public cryptographic key to the server 100, where these keys are saved in the confidential database 110 and coordinated with the user's identifier (for example, the user's log-in or a check sum from the user's log-in, the identifier of the device from which the user is performing the authentication on the server 100).

According to one aspect, the process of encryption of the private cryptographic key with the user's biometric data may be based on an algorithm using fuzzy containers and can include, for example: taking a photo/image of the user's fingerprint and based on the photo/image of the user's fingerprint, searching for points of interest (elements of the papillary pattern such as arches, loops, whorls, and the like) and calculating their parameters (i.e., the coordinates locating the elements of the papillary pattern with respect to other elements of the papillary pattern, the dimensions, the type of elements of the papillary pattern, and the like). Next, the private cryptographic key previously created by the user, being a 128-byte (1024-bit) buffer, divided up into a sequence of 32 4-byte numbers. For the parameters (such as one-dimensional horizontal coordinates of the position of the elements of the papillary pattern with regard to other elements of the papillary pattern) of all the points of interest, the values are computed for the polynomial:

$$y_j = \sum_{i=1}^{N} k_i \times x_j^i$$

where $y_j$—value of the polynomial for the selected point of interest,
$k_i$—i-th 4-byte number obtained from the cryptographic private key,
$x_j^i$—parameter of the j-th point of interest,
N—degree of the polynomial, equal to the set of numbers obtained from the cryptographic private key.

Furthermore, from the obtained values of the polynomial, an array of values is generated, being supplemented with "garbage"—i.e., random numbers, where the resulting array constitutes the encrypted private cryptographic key.

Subsequently, upon applying to the server 100 for authentication, the user provides his/her identifier. Based on the indicated identifier, the confidential data controller 120 on the server 100 performs a search for the encrypted confidential user data in the confidential database 110. If the search is successful, the confidential data controller 120 will send the encrypted private cryptographic key to the user.

Next, after the user obtains from the encrypted private cryptographic key, the biometric data controller 130, based on the biometric pattern of the user (e.g., a fingerprint), collects biometric data such as an image of the fingerprint. After obtaining the image of the fingerprint, the biometric data controller 130 will use the image to perform a search for points of interest (e.g., elements of the papillary pattern such as arches, loops, whorls, and the like) and calculate their parameters (e.g., the coordinates locating the elements of the papillary pattern with respect to other elements of the papillary pattern, the dimensions, the type of elements of the papillary pattern, and the like). The set of computed parameters, constituting a biometric key, is sent to the decryption module 140 for decrypting of the encrypted private cryptographic key obtained from the confidential data controller 120.

According to one exemplary aspect, the decryption module 140 uses an algorithm of fuzzy containers to decrypt the encrypted private cryptographic key obtained from the confidential data controller 120. According to this aspect, the algorithm can include taking the biometric key obtained from the biometric data controller 130, and forming a certain set of parameters of points of interest $x_j^i$; taking the encrypted private cryptographic key obtained from the confidential data controller 120, and forming a certain set of numbers $y_j$; solving the following polynomial:

$$y_j = \sum_{i=1}^{N} k_i \times x_j^i$$

where $y_j$—value of the polynomial for the selected point of interest,
$k_i$—i-th 4-byte number obtained from the cryptographic private key,
$x_j^i$—parameter of the j-th point of interest,
N—degree of the polynomial, equal to the set of numbers obtained from the cryptographic private key; determining precisely which numbers $y_j$, being values of the polynomial, result in a more accurate solution of the polynomial and, consequently, are parameters for calculating the components of the private cryptographic key; and from the values determined for the polynomial $y_j$, calculating the coefficients of the polynomial $k_i$, which are the components of the private cryptographic key.

Next, after all coefficients of the polynomial have been calculated, the decryption module 140 can calculate (or reconstruct) the private cryptographic key. In one examplary aspect, an array of 32 4-byte coefficients is formed for this purpose, corresponding to a 128-byte (1024-bit) private cryptographic key. After this calculation, the calculated cryptographic private key can be sent to the encryption module 150.

According to one exemplary aspect, the encryption module 150 creates a random set of data so that the data set never repeats from one authentication to the next. The size of the data set is chosen on the principle that the probability of coinciding with the data sets created during past authentications is minimal (which is accomplished by increasing the size of the data set), yet not such as to slow down the data transmission speed (accomplished by decreasing the size of the data set). After this, in one variant aspect, the data set created is encrypted by the private cryptographic key received from the decryption module 140 by an asymmetrical encryption algorithm based on the Schnorr scheme. After completing the encryption, the encrypted data set (which forms the electronic digital signature of the user) is sent to the verification module 160.

The verification module 160 is configured to check the electronic digital signature received from the encryption module 150 by an asymmetrical encryption algorithm based on the Schnorr scheme with the use of the public cryptographic key received from the confidential data controller 120. The result of the check is a verdict/determination that the current public cryptographic key belongs to the pair of public and private cryptographic keys of which the private cryptographic key was used by the encryption module 150 to create the electronic digital signature being checked. If this condition is satisfied, it is determined that the user has successfully undergone authentication in the system. The transmitted electronic digital signature is used to calculate the check sum (e.g., md5), which is saved on the server 100 in the confidential database 110 so that, in the event of a repeat authentication by the same electronic digital signature, the electronic digital signature already checked will not be checked, but instead a denial of authentication thereof will be issued at once (such that any electronic digital signature transmitted to the verification module 160 is a onetime signature).

Advantageously, the disclosed authentication scheme prevents the possibility of hackers "side-stepping" the user authentication, because the vulnerabilities of the authentication are protected. For example, intercepting an electronic digital signature and then sending it to the server (i.e., the verification module 160) does not work, because the current electronic digital signature is a onetime signature, and the verification module 160 after receiving the digital signature once more will issue a denial of authentication. Moreover, hackers cannot create their own electronic digital signature because the private cryptographic key is not kept in clear form either by the user or on the server, nor is it transmitted between them. In addition, it is not possible to decrypt the encrypted private cryptographic key (which could be stolen from the user's device, the server, or during transmission from server to user's device), since the biometric data which is the key to successful decryption of the private cryptographic key is absent.

Figure 2:
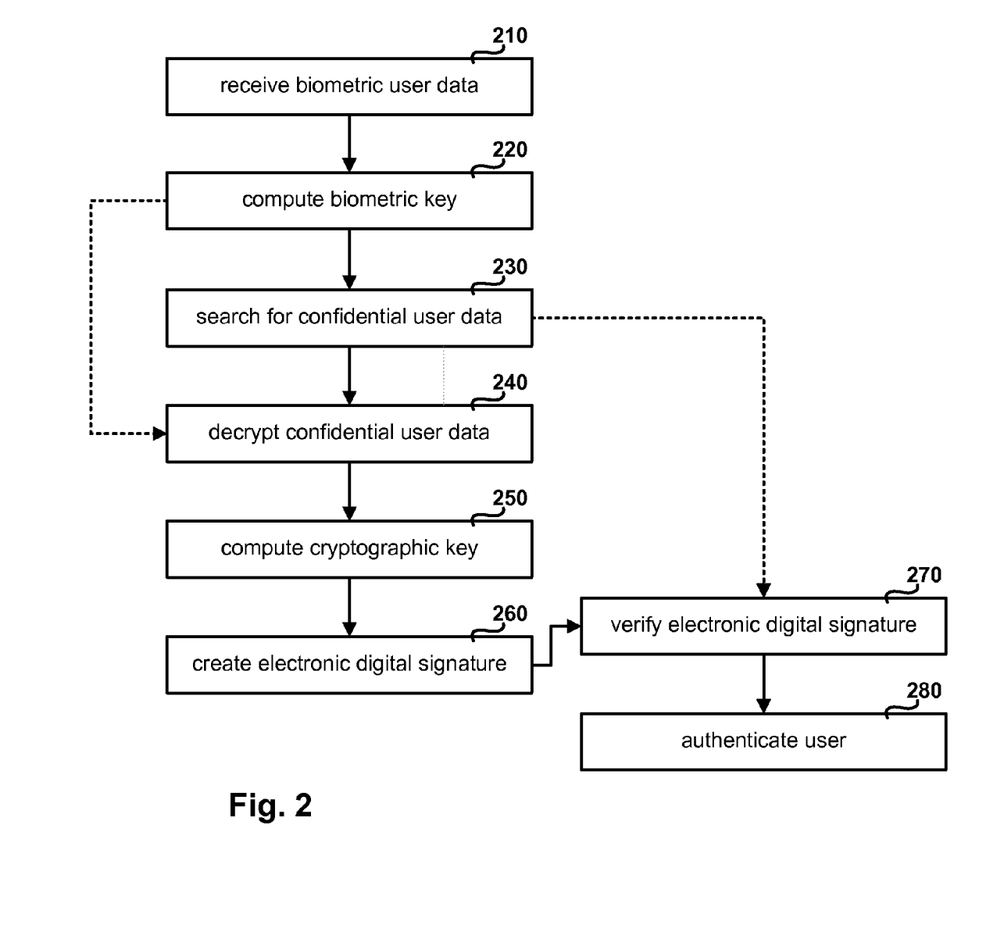
FIG. 2 illustrates a flow chart for a method of user authentication according to an exemplary aspect.

FIG. 2 illustrates a flow chart for a method of user authentication according to an exemplary aspect. As generally shown, the exemplary method includes obtaining the user's biometric data at step 210, calculating the biometric key at step 220, searching for confidential user data at step 230, decrypting confidential user data at step 240, calculating the cryptographic key at step 250, creating the electronic digital signature at step 260, verifying the electronic digital signature at step 270, and authenticating the user at step 280.

In particular, in step 210, the biometric data can be obtained from the user's biometric pattern (e.g., the image of a fingerprint, a retinal scan, and the like).

Next, in step 220, on the basis of the biometric data received in step 210, the biometric key is calculated that will be used in step 240. In one aspect, the biometric key can be at least a set of parameters of points of interest (such as the coordinates locating the elements of the papillary pattern with respect to other elements of the papillary pattern, the dimensions, the types of elements of the papillary pattern, and the like, for fingerprints). Further, according to one aspect, the method of calculating the biometric key on the basis of the gathered biometric data is at least a determination of the parameters of the points of interest.

Next, in step 230, in response to a user request, a search is performed for encrypted confidential user data in the confidential database 110 for use thereof during steps 240 and 270. In one aspect, the confidential data saved in encrypted form in the confidential database 110 can include at least the cryptographic keys for the asymmetrical encryption system: the public cryptographic key and the private cryptographic key, and the parameters by which the cryptographic keys can be computed for the asymmetrical encryption system (such as 32 4-byte numbers from which a 1024-bit cryptographic key will be assembled). Furthermore, according to one aspect, the search criterion for the encrypted confidential data can include, at least, the log-in or check sum (e.g., md5) from the user's log-in, and the identifier of the device from which the user is performing the authentication on the server 100.

Furthermore, in step 240, the biometric key calculated in step 220 can be used to decrypt the encrypted confidential user data found during step 230. According to one aspect, the method of decrypting with the biometric key the encrypted confidential user data is at least an algorithm using fuzzy containers.

Next, in step 250, the cryptographic key is calculated on the basis of the decrypted confidential user data obtained in step 240. The method of calculating the cryptographic key based on the decrypted confidential user data (which are the components of the cryptographic key) is at least a concatenation of the components of the cryptographic key.

In step 260, the electronic digital signature of the user is created with the aid of the cryptographic key obtained in step 250. According to one aspect, the creation of the electronic digital signature of the user is performed by encrypting a set of data with the cryptographic key obtained in step 250. In one exemplary aspect, the data can include, but is not limited to, a random data set (for example, one created before beginning the creation of the electronic digital signature of the user), and/or a timestamp (for example, the timestamp of the search in step 230 for the encrypted confidential user data in the confidential database 110).

In step 270, the electronic digital signature obtained in step 260 is verified using, at least in part, the confidential user data from the confidential database 110, which was obtained in step 230. According to one aspect, the confidential user data used to check the electronic digital signature obtained in step 260 can be, for example, a public cryptographic key (in the event that a private cryptographic key was the encrypted confidential data transmitted in step 230 by the confidential data controller 120 to the decryption module 140), or a private cryptographic key (in the event that a public cryptographic key was the encrypted confidential data transmitted in step 230 by the confidential data controller 120 to the decryption module 140).

According to one aspect, the verification of the electronic digital signature obtained in step 260 with the help of the public cryptographic key from the confidential database 110 is at least one of the asymmetrical algorithms for checking an electronic digital signature. Moreover, the verification of the electronic digital signature obtained in step 260 using the private cryptographic key from the confidential database 110 can be at least one of the asymmetrical encryption algorithms.

According to one aspect, the results of the verification of the electronic digital signature obtained from step 260 by one of the asymmetrical algorithms can be at least a verdict/determination that the public cryptographic key used to perform the verification of the electronic digital signature belongs to the pair of cryptographic public and private keys from which the private cryptographic key was used in step 260 to create the electronic digital signature being checked. If this condition is satisfied, the result of the checking of the electronic digital signature obtained in step 260 is considered to be positive. Moreover, the results of the verification of the electronic digital signature obtained from step 260 by one of the asymmetrical algorithms can be a verdict/determination that the encrypted data decrypted by the private cryptographic key in the form of the electronic digital signature obtained in step 260 is identical to the data created in step 270.

According to one aspect, the data created in step 270 for use in checking the electronic digital signature obtained in step 260 can be, for example, a timestamp (for example, the timestamp of the search for encrypted confidential user data in the confidential database 110 in step 230).

Finally, at step 280, the user is authenticated based on the results of the check performed in step 270.

The following is an illustrative example of operation of the user authentication on a server using a fingerprint. Initially, prior to registration on the server 100 the user has created a pair of cryptographic keys (public and private cryptographic keys). Next, the user encrypts the public cryptographic key with his biometric data, and sends the encrypted public cryptographic key and the private cryptographic key to the server 100, where they are saved in the confidential database 110 and coordinated with the user's identifier (for example, the user's log-in or a check sum from the user's log-in, the identifier of the device from which the user is performing the authentication on the server 100).

According to the exemplary aspect, in step 210 the biometric pattern of the user, such as a fingerprint or retinal pattern, is used to collect biometric data, such as an image of the fingerprint. After obtaining the image of the fingerprint, in step 220, the image is used to search for points of interest (elements of the papillary pattern such as arches, loops, whorls, and so on) and calculate their parameters (the coordinates locating the elements of the papillary pattern with respect to other elements of the papillary pattern, the dimensions, the type of elements of the papillary pattern, and so on). The set of computed parameters, forming a biometric key, is used in step 240 for decrypting of the encrypted private cryptographic key obtained in step 230.

Upon applying to the server 100 for the purpose of authentication, the user indicates his identifier. Based on this identifier, a search is executed on the server 100 (in step 230) for encrypted confidential user data in the confidential database 110. If the search is successful, the encrypted public cryptographic key is sent to the user.

After the user has obtained the encrypted public cryptographic key, this key is decrypted in step 240 with the biometric key obtained in step 220. In one examplary aspect, an algorithm of using fuzzy containers is used for this purpose. This algorithm can include: taking the biometric key obtained in step 220, and forming a certain set of parameters of points of interest $x_j^i$; taking the encrypted public cryptographic key obtained in step 230, and forming a certain set of numbers $y_j$; solving the polynomial $$y_j = \sum_{i=1}^{N} k_i \times x_j^i;$$

determining precisely which numbers $y_j$, being values of the polynomial, result in a more accurate solution of the polynomial and, consequently, are parameters for calculating the components of the public cryptographic key; and from the values determined for the polynomial $y_j$, calculating the coefficients of the polynomial $k_i$, which are the components of the public cryptographic key.

After all coefficients of the polynomial have been calculated, a calculation (or more precisely, a reconstruction) of the public cryptographic key is done in step 250. In one variant aspect, an array of 32 4-byte coefficients is formed for this purpose, corresponding to a 128-byte (1024-bit) public cryptographic key.

Next, in step 260, a timestamp is generated of the search in step 230 for encrypted confidential user data in the confidential database 110 (such that the timestamp never repeats from one authentication to another). After this, in one variant aspect, the timestamp created is encrypted by the public cryptographic key obtained in step 250 using an asymmetrical algorithm of encryption by the RSA scheme. After the encryption is finished, the encrypted timestamp constitutes the electronic digital signature of the user.

Next, in step 270, the electronic digital signature obtained in step 260 is checked by the asymmetrical encryption algorithm of the RSA scheme with the use of the private cryptographic key obtained in step 230. That is, the electronic digital signature is decrypted by the private cryptographic key and the timestamp is obtained for the search in step 230 for encrypted confidential user data in the confidential database 110. The result of the verification is a verdict/determination that the encrypted timestamp decrypted by the private cryptographic key and the timestamp of the search in step 230 for encrypted confidential user data in the confidential database 110, obtained in step 270, are identical.

If the timestamps obtained in steps 260 and 270 match, it is determined in step 280 that the user has successfully undergone authentication in the system.

As described above, the authentication method eliminates the possibility of hackers "side-stepping" the user authentication, because the vulnerabilities of the authentication are protected. For example, intercepting an electronic digital signature and then sending it to the server (for verification module in step 270) does not work, because the timestamp of the authentication request, encrypted in the electronic digital signature, and the timestamp of the current authorization request do not match. Moreover, hackers cannot create their own electronic digital signature, because the public cryptographic key is not kept in clear form either by the user or on the server, nor is it transmitted between them. Finally, it is not possible to decrypt the encrypted public cryptographic key (which could be stolen from the user's device, the server, or during transmission from server to user's device), since the biometric data which is the key to successful decryption of the public cryptographic key is absent.

Figure 3:
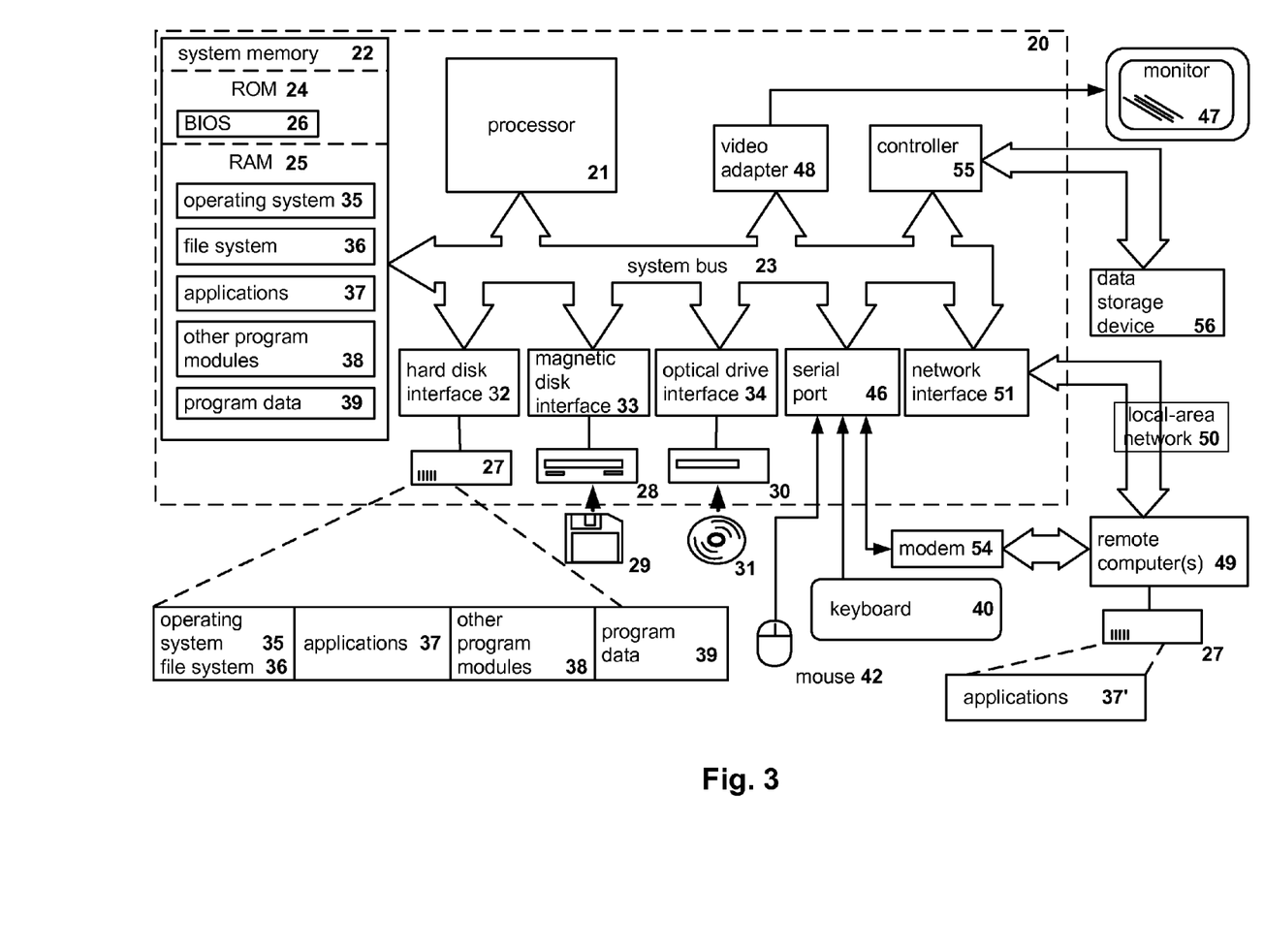
FIG. 3 illustrates an example of a general-purpose computer system (which may be a personal computer or a server) on which the disclosed systems and method can be implemented according to an example aspect.

FIG. 3 illustrates an example of a general-purpose computer system (which may be a personal computer or a server)

on which the disclosed systems and method can be implemented according to an example aspect.

As shown, the computer system includes a central processing unit 21, a system memory 22 and a system bus 23 connecting the various system components, including the memory associated with the central processing unit 21. The system bus 23 is realized like any bus structure known from the prior art, containing in turn a bus memory or bus memory controller, a peripheral bus and a local bus, which is able to interact with any other bus architecture. The system memory includes permanent memory (ROM) 24 and random-access memory (RAM) 25. The basic input/output system (BIOS) 26 includes the basic procedures ensuring the transfer of information between elements of the personal computer 20, such as those at the time of loading the operating system with the use of the ROM 24.

The personal computer 20, in turn, includes a hard disk 27 for reading and writing of data, a magnetic disk drive 28 for reading and writing on removable magnetic disks 29 and an optical drive 30 for reading and writing on removable optical disks 31, such as CD-ROM, DVD-ROM and other optical information media. The hard disk 27, the magnetic disk drive 28, and the optical drive 30 are connected to the system bus 23 across the hard disk interface 32, the magnetic disk interface 33 and the optical drive interface 34, respectively. The drives and the corresponding computer information media are power-independent modules for storage of computer instructions, data structures, program modules and other data of the personal computer 20.

The present disclosure provides the implementation of a system that uses a hard disk 27, a removable magnetic disk 29 and a removable optical disk 31, but it should be understood that it is possible to employ other types of computer information media 56 which are able to store data in a form readable by a computer (solid state drives, flash memory cards, digital disks, random-access memory (RAM) and so on), which are connected to the system bus 23 via the controller 55.

The computer 20 has a file system 36, where the recorded operating system 35 is kept, and also additional program applications 37, other program modules 38 and program data 39. The user is able to enter commands and information into the personal computer 20 by using input devices (keyboard 40, mouse 42). Other input devices (not shown) can be used: microphone, joystick, game controller, scanner, and so on. Such input devices usually plug into the computer system 20 through a serial port 46, which in turn is connected to the system bus, but they can be connected in other ways, for example, with the aid of a parallel port, a game port or a universal serial bus (USB). A monitor 47 or other type of display device is also connected to the system bus 23 across an interface, such as a video adapter 48. In addition to the monitor 47, the personal computer can be equipped with other peripheral output devices (not shown), such as loudspeakers, a printer, and so on.

The personal computer 20 is able to operate in a network environment, using a network connection to one or more remote computers 49. The remote computer (or computers) 49 are also personal computers or servers having the majority or all of the aforementioned elements in describing the nature of a personal computer 20, as shown in FIG. 3. Other devices can also be present in the computer network, such as routers, network stations, peer devices or other network nodes.

Network connections can form a local-area computer network (LAN) 50 and a wide-area computer network (WAN). Such networks are used in corporate computer networks and internal company networks, and they generally have access to the Internet. In LAN or WAN networks, the personal computer 20 is connected to the local-area network 50 across a network adapter or network interface 51. When networks are used, the personal computer 20 can employ a modem 54 or other modules for providing communications with a wide-area computer network such as the Internet. The modem 54, which is an internal or external device, is connected to the system bus 23 by a serial port 46. It should be noted that the network connections are only examples and need not depict the exact configuration of the network, i.e., in reality there are other ways of establishing a connection of one computer to another by technical communication modules.

In various aspects, the systems and methods described herein may be implemented in hardware, software, firmware, or any combination thereof. If implemented in software, the methods may be stored as one or more instructions or code on a non-transitory computer-readable medium. Computer-readable medium includes data storage. By way of example, and not limitation, such computer-readable medium can comprise RAM, ROM, EEPROM, CD-ROM, Flash memory or other types of electric, magnetic, or optical storage medium, or any other medium that can be used to carry or store desired program code in the form of instructions or data structures and that can be accessed by a processor of a general purpose computer.

In various aspects, the systems and methods described in the present disclosure can be addressed in terms of modules. The term "module" as used herein refers to a real-world device, component, or arrangement of components implemented using hardware, such as by an application specific integrated circuit (ASIC) or field-programmable gate array (FPGA), for example, or as a combination of hardware and software, such as by a microprocessor system and a set of instructions to implement the module's functionality, which (while being executed) transform the microprocessor system into a special-purpose device. A module can also be implemented as a combination of the two, with certain functions facilitated by hardware alone, and other functions facilitated by a combination of hardware and software. In certain implementations, at least a portion, and in some cases, all, of a module can be executed on the processor of a general purpose computer (such as the one described in greater detail in FIG. 6 above). Accordingly, each module can be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method for authenticating a user to access first data stored on a remote data storage system, the method comprising:
   calculating, by a processor, a biometric key based on biometric data of the user;
   encrypting, by the processor, confidential information of the user based on the biometric data of the user;
   decrypting, by the processor, confidential information of the user using the calculated biometric key;
   calculating, by the processor, a cryptographic key using at least a first portion of the decrypted confidential information of the user;
   generating, by the processor, an electronic digital signature of the user by encrypting, using the cryptographic key a random set of second data and a timestamp for when the encrypted confidential information of the user is identified in an electronic database;
   verifying, by the processor, the electronic digital signature using at least a second portion of the decrypted confidential information; and
   authenticating, by the processor, the user to access the first data stored on the remote data storage system if the electronic digital signature is verified;
   wherein verifying the electronic digital signature, comprises:
      decrypting the electronic digital signature using the second portion of the decrypted confidential information; and
      comparing the timestamp from the decrypted electronic digital signature with an original timestamp for when the encrypted confidential information of the user is identified in the electronic database.

2. The method of claim 1, wherein the first portion of the decrypted confidential information of the user is one of a public cryptographic key and a private cryptographic key, and the second portion of the decrypted confidential information of the user is the corresponding private or public cryptographic key.

3. The method of claim 1, wherein the random set of second data further comprises a random data set.

4. The method of claim 1, wherein the encrypted confidential information of the user comprises an encrypted private cryptographic key based on the biometric data of the user.

5. The method of claim 4, further comprising storing the encrypted private cryptographic key in the electronic database by:
   obtaining an image of a fingerprint of the user;
   identifying for points of interest in the image;
   calculating parameters of the points of interest;
   creating the encrypted private cryptographic key based on the calculated parameters of the points of interest; and
   storing the encrypted private cryptographic key in the electronic database.

6. The method of claim 5, wherein values of the parameters are calculated for the polynomial:

$$y_j = \sum_{i=1}^{N} k_i \times x_j^i$$

where $y_j$ is a value of the polynomial for a selected point of interest,
$k_i$ is an ith 4-byte number obtained from the cryptographic private key,
$x_j^i$ is a parameter of the $j^{th}$ point of interest, and
N is a degree of the polynomial that is equal to a set of numbers obtained from the cryptographic private key.

7. The method of claim 1, wherein the biometric data includes one or more of a fingerprint, a retinal scan, an iris recognition data, a voice sample, a handwriting sample, one or more lexical speech parameters, and type of gestures or gait.

8. A system for authenticating a user to access first data stored on a remote data storage system, the system comprising:
   an electronic database configured to stored encrypted confidential information of the user; and
   a hardware processor configured to:
      calculate a biometric key based on biometric data of the user;
      encrypt confidential information of the user based on the biometric data of the user;
      decrypt confidential information of the user using the calculated biometric key;
      calculate a cryptographic key using at least a first portion of the decrypted confidential information of the user;
      generate an electronic digital signature of the user by encrypting, using the cryptographic key, a random set of second data and a timestamp for when the encrypted confidential information of the user is identified in an electronic database;
      verify the electronic digital signature using at least a second portion of the decrypted confidential information; and
      authenticate the user to access the first data stored on the remote data storage system if the electronic digital signature is verified;
   wherein the hardware processor is configured to verify the electronic digital signature by:
      decrypting the electronic digital signature using the second portion of the decrypted confidential information; and
      comparing the timestamp from the decrypted electronic digital signature with an original timestamp for when the encrypted confidential information of the user is identified in the electronic database.

9. The system of claim 8, wherein the first portion of the decrypted confidential information of the user is one of a public cryptographic key and a private cryptographic key, and the second portion of the decrypted confidential information of the user is the corresponding private or public cryptographic key.

10. The system of claim 8, wherein the random set of second data further comprises a random data set.

11. The system of claim 8, wherein the encrypted confidential information of the user comprises an encrypted private cryptographic key based on the biometric data of the user.

12. The system of claim 11, wherein the hardware processor is configured to store the encrypted private cryptographic key in the electronic database by:
  obtaining an image of a fingerprint of the user;
  identifying for points of interest in the image;
  calculating parameters of the points of interest;
  creating the encrypted private cryptographic key based on the calculated parameters of the points of interest; and
  storing the encrypted private cryptographic key in the electronic database.

13. The system of claim 12, wherein values of the parameters are calculated for the polynomial:

$$y_j = \sum_{i=1}^{N} k_i \times x_j^i$$

where $y_j$ is a value of the polynomial for a selected point of interest,
  $k_i$ is an ith 4-byte number obtained from the cryptographic private key,
  $x_j^i$ is a parameter of the $j^{th}$ point of interest, and
  N is a degree of the polynomial that is equal to a set of numbers obtained from the cryptographic private key.

14. The system of claim 8, wherein the biometric data includes one or more of a fingerprint, a retinal scan, an iris recognition data, a voice sample, a handwriting sample, one or more lexical speech parameters, and type of gestures or gait.

15. A non-transitory computer readable medium storing computer executable instructions for authenticating a user to access first data stored on a remote data storage system, including instructions for:
  calculating a biometric key based on the biometric data of the user;
  encrypting confidential information of the user based on the biometric data of the user;
  decrypting confidential information of the user using the calculated biometric key;
  calculating a cryptographic key using at least a first portion of the decrypted confidential information of the user;
  generating an electronic digital signature of the user by encrypting, using the cryptographic key, a random set of second data and a timestamp for when the encrypted confidential information of the user is identified in an electronic database;
  verifying the electronic digital signature using at least a second portion of the decrypted confidential information; and
  authenticating the user to access the first data stored on the remote data storage system if the electronic digital signature is verified;

wherein verifying the electronic digital signature, comprises:
  decrypting the electronic digital signature using the second portion of the decrypted confidential information; and
  comparing the timestamp from the decrypted electronic digital signature with an original timestamp for when the encrypted confidential information of the user is identified in the electronic database.

16. The non-transitory computer readable medium of claim 15, wherein the first portion of the decrypted confidential information of the user is one of a public cryptographic key and a private cryptographic key, and the second portion of the decrypted confidential information of the user is the corresponding private or public cryptographic key.

17. The non-transitory computer readable medium of claim 15, wherein the random set of second data further comprises a random data set.

18. The non-transitory computer readable medium of claim 15, wherein the encrypted confidential information of the user comprises an encrypted private cryptographic key based on the biometric data of the user.

19. The non-transitory computer readable medium of claim 18, further including instructions for storing the encrypted private cryptographic key in the electronic database by:
  obtaining an image of a fingerprint of the user;
  identifying for points of interest in the image;
  calculating parameters of the points of interest;
  creating the encrypted private cryptographic key based on the calculated parameters of the points of interest; and
  storing the encrypted private cryptographic key in the electronic database.

20. The non-transitory computer readable medium of claim 19, wherein values of the parameters are calculated for the polynomial:

$$y_j = \sum_{i=1}^{N} k_i \times x_j^i$$

where $y_j$ is a value of the polynomial for a selected point of interest,
  $k_i$ is an ith 4-byte number obtained from the cryptographic private key,
  $x_j^i$ is a parameter of the $j^{th}$ point of interest, and
  N is a degree of the polynomial that is equal to a set of numbers obtained from the cryptographic private key.

21. The non-transitory computer readable medium of claim 15, wherein the biometric data includes one or more of a fingerprint, a retinal scan, an iris recognition data, a voice sample, a handwriting sample, one or more lexical speech parameters, and type of gestures or gait.

* * * * *